(12) United States Patent
Chen

(10) Patent No.: US 8,556,220 B1
(45) Date of Patent: Oct. 15, 2013

(54) LOCKING DEVICE FOR A DISPLAY MOUNTING ASSEMBLY

(75) Inventor: Chia-Cheng Chen, Taichung (TW)

(73) Assignees: Hi-Max Innovation Co., Ltd., Taichung (TW); Yi-Chen Tseng, Taichung (TW)

( * ) Notice: Subject to any disclaimer, the term of this patent is extended or adjusted under 35 U.S.C. 154(b) by 92 days.

(21) Appl. No.: 13/433,911

(22) Filed: Mar. 29, 2012

(51) Int. Cl.
*A47B 96/00* (2006.01)

(52) U.S. Cl.
USPC .... 248/222.13; 248/304; 248/339; 248/294.1

(58) Field of Classification Search
USPC ............... 248/222.13, 205.1, 220.21, 220.22, 248/221.11, 222.11, 222.12, 294.1, 304, 248/309.1, 317, 339, 340, 917, 918; 361/679.21
See application file for complete search history.

(56) References Cited

U.S. PATENT DOCUMENTS

| | | | |
|---|---|---|---|
| D497,537 S * | 10/2004 | O'Keene et al. | D8/355 |
| 6,923,413 B2 * | 8/2005 | Dozier | 248/294.1 |
| 7,712,717 B2 * | 5/2010 | Burns | 248/291.1 |
| 7,731,143 B2 * | 6/2010 | Muday et al. | 248/284.1 |
| 8,025,264 B2 * | 9/2011 | Cheng et al. | 248/222.13 |
| 2007/0007409 A1 * | 1/2007 | Huang | 248/220.21 |

* cited by examiner

*Primary Examiner* — Todd M. Epps
(74) *Attorney, Agent, or Firm* — Banger Shia

(57) ABSTRACT

A locking device for a display mounting assembly comprises, a base frame, two mounting racks and two locking members, wherein the assembly and disassembly of the mounting racks and the base frame can be easily achieved by a simple action of pulling and pressing of the locking members. Furthermore, it doesn't have to drill through holes and the elongated holes in the mounting racks, which consequently reduces manufacturing cost.

3 Claims, 7 Drawing Sheets

LOCKING DEVICE FOR A DISPLAY MOUNTING ASSEMBLY

BACKGROUND OF THE INVENTION

1. Field of the Invention

The present invention relates to a display mounting assembly, and more particularly to a locking device for a display mounting assembly.

2. Description of the Prior Art

A conventional locking device for a display mounting assembly as shown in FIG. 1, essentially comprises a mounting rack 10, two support frames 20 and a shaft 30. The mounting rack 10 is formed by two transverse rods 13 and two longitudinal rods 14. Between the two transverse rods 13 are disposed two fixing plates 12, and each of the transverse rods 13 is formed in the lateral sides thereof with a through hole 15. The support frames 20 each are formed with a plurality of support holes 23 and two opposite walls 21. Each of the walls 21 is formed with a hook 211 to be hooked on the two transverse rods 13 and further formed with an elongated hole 25, so that the shaft 30 can be inserted through the through holes 15 and the elongated holes 25.

When in use, the mounting rack 10 is firstly fixed to a mounting seat (not shown), the support frames 20 are then fixed to the back of a display 40 by screwing bolts (not shown) through the support holes 23, then the two hooks 211 of the two support frames 20 are hooked to the two transverse rods 13, and finally the shaft 30 is inserted I the through holes 15 and the elongated holes 25, so that the support frames 20 are stably jointed to the two transverse rods 13.

It is to be noted that, when in assembly, it is hard to insert the shaft through the through holes 15 and the elongated holes 25 since aligning the through holes 15 and the elongated holes 25 with one another is not easy. Similarly, when in disassembly, it also has to pull out the shaft 30, then the mounting rack 10 and the support frames 20 can be disassembled.

On the other hand, to accommodate the shaft 30, it has to drill the through holes 15 and the elongated holes 25 in the mounting rack 10 and the support frames 20, which will increase manufacturing cost.

To solve the abovementioned problems, an improved conventional display mounting assembly as shown in FIGS. 2A and 2B, appeared on the market, and improvement is that at the lower portion of each of the two support frames 20 is disposed a bolt 31 which is screwed to the lower transverse rod 13.

However, assembly or disassembly of the display mounting assembly is still inconvenient since it requires screwing or unscrewing the bolts 31 in and out of the lower transverse rod 13.

The present invention has arisen to mitigate and/or obviate the afore-described disadvantages.

SUMMARY OF THE INVENTION

The primary object of the present invention is to provide a locking device for a display mounting assembly, which can make the assembly and disassembly much easier and quicker since the assembly and disassembly can be achieved simply by an action of pulling and pressing.

Another object of the present invention is to provide a locking device for a display mounting assembly, wherein the present invention doesn't have to drill through holes and the elongated holes in the mounting racks, which consequently reduces manufacturing cost.

To achieve the above objects, a locking device for a display mounting assembly comprises, a base frame, two mounting racks and two locking members.

The base frame is formed by an upper rod, a lower rod, a left rod, and a right rod.

The two mounting racks each include a mounting surface and two lateral walls at both sides of the mounting surface. In the mounting surface are formed a plurality of mounting holes, each of the lateral walls is formed with an upper hook and a lower hook to be hooked to the upper and lower, and each of the lower hooks is formed with a pivot hole.

The two locking members are made of flexible material and each include a pulling end. At both sides of the pulling end are formed two pivot portions, and each of the pivot portions is provided with a pivot member. Between the pivot portions and the pulling end is formed a locking portion in the form of an arch-shaped concave. The pivot members of the locking members are fitted in the pivot holes of the mounting racks, so that the locking members are able to pivot with respect to the mounting racks via the pivot portions, and the locking portion are flexibly deformable to be engaged with the lower rod.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
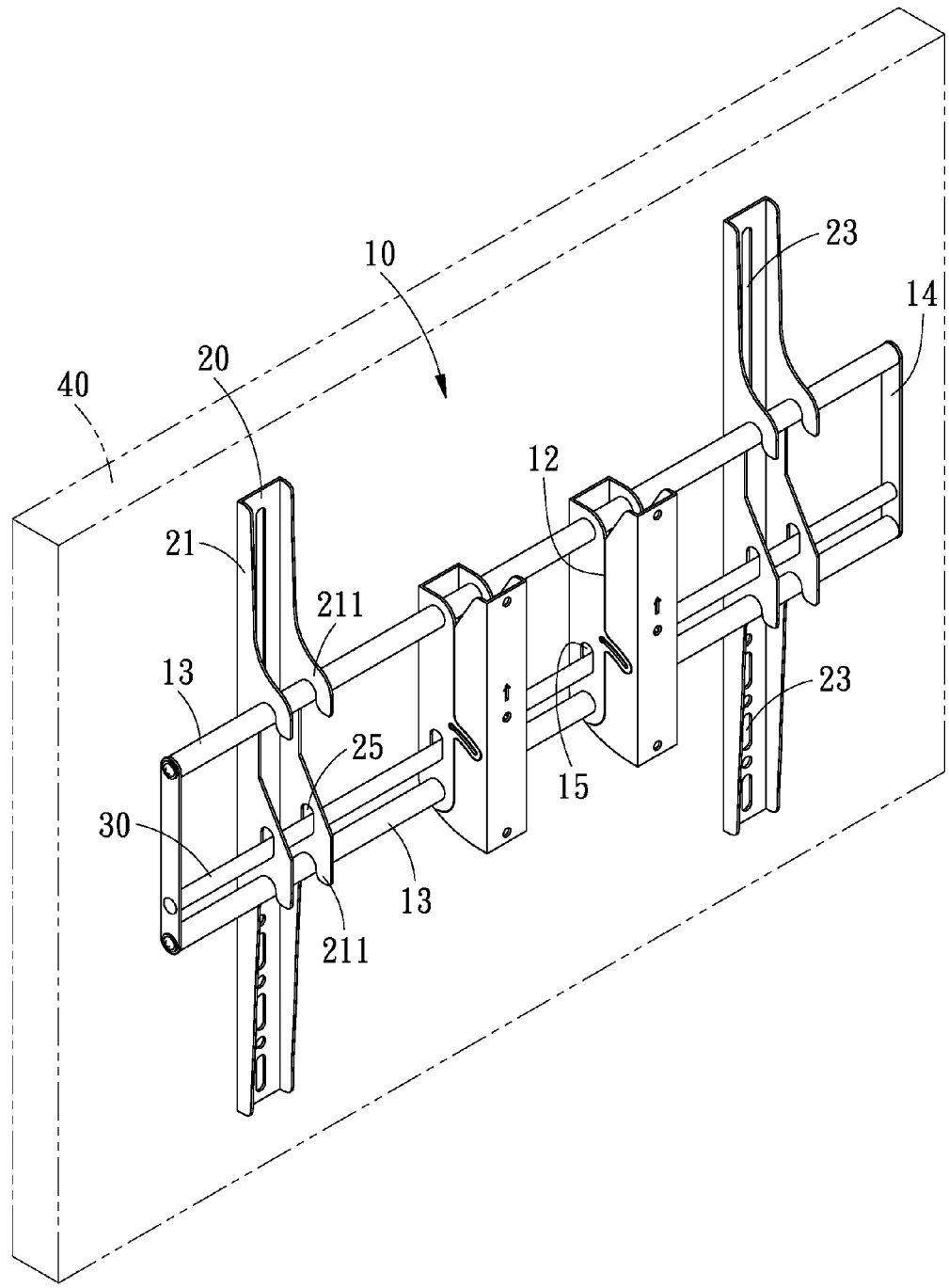
FIG. 1 is a perspective view of a conventional locking device for a display mounting assembly.
Figure 2A:
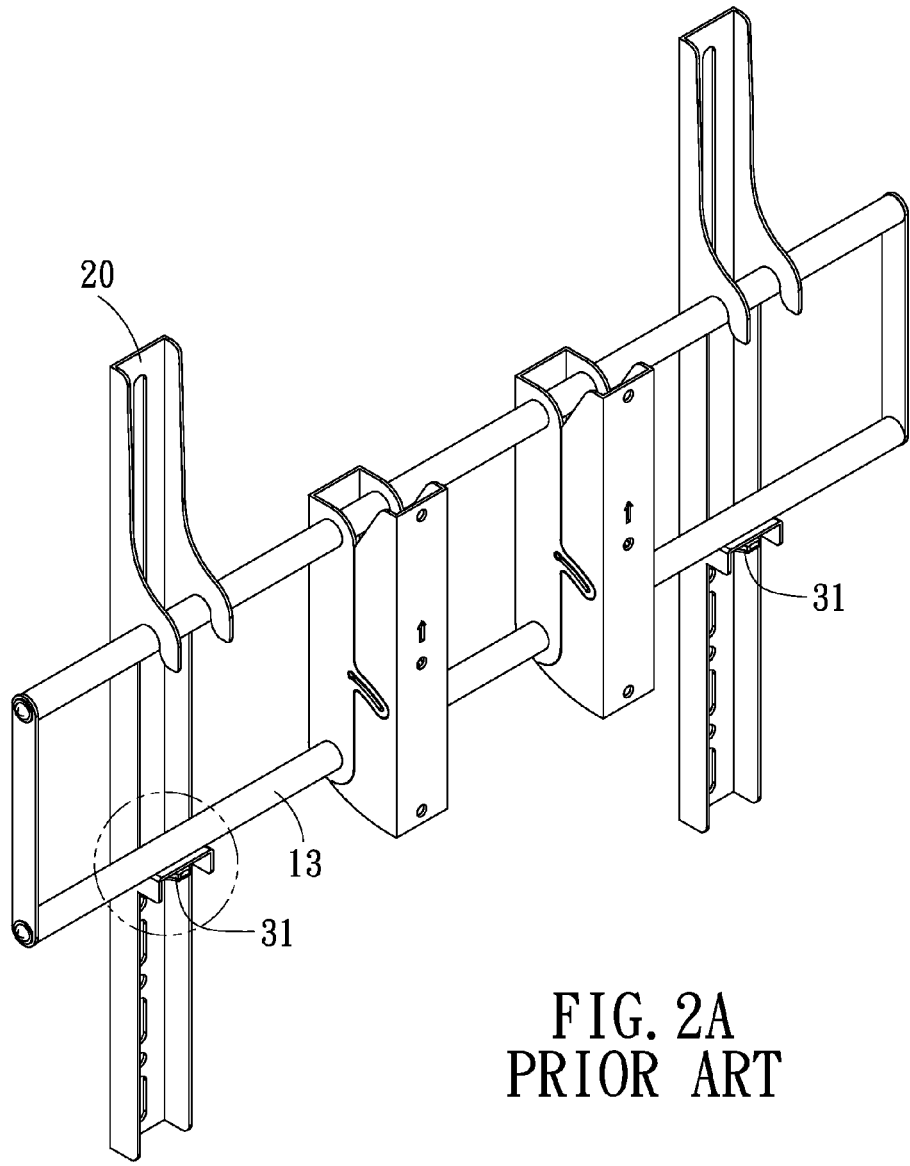
FIG. 2A is a perspective view of another conventional locking device for a display mounting assembly.
Figure 2B:
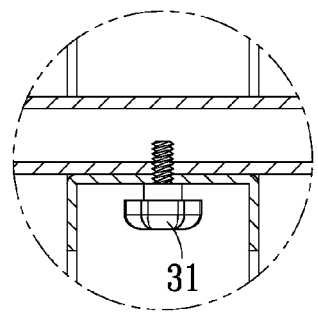
FIG. 2B is an enlarged view of a part of FIG. 2A.
Figure 3:
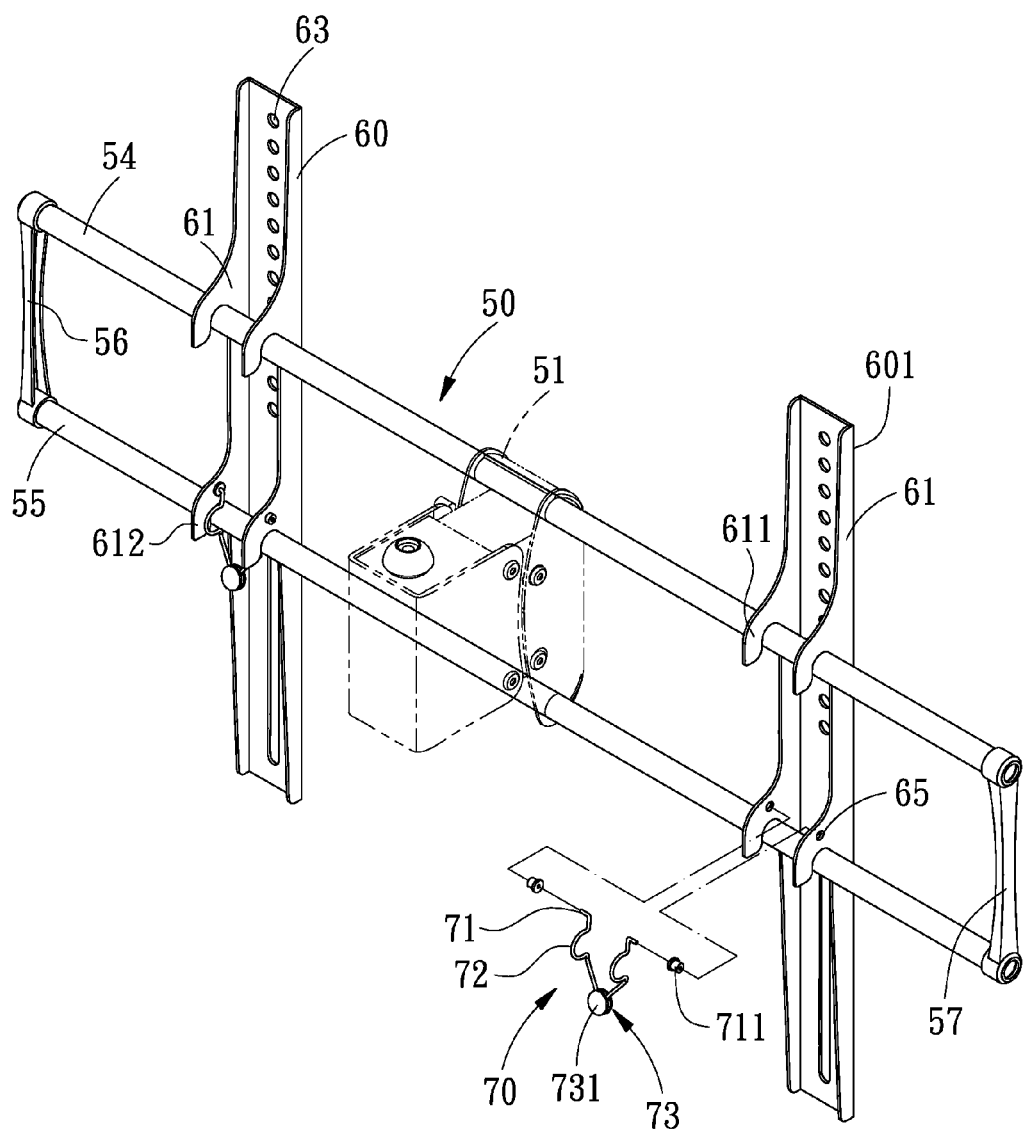
FIG. 3 is a perspective view of a locking device for a display mounting assembly in accordance with the present invention, wherein the locking member is pulled down.

Referring to FIG. 3, a locking device for a display mounting assembly in accordance with a preferred embodiment of the present invention comprises, a base frame 50, two mounting racks 60, and two locking members 70.

The base frame 50 is formed by an upper rod 54, a lower rod 55, a left rod 56, and a right rod 57. Between the upper and lower rods 54, 55 is disposed a fixing member 51 for fixing the base frame 50 to a mounting seat (not shown).

Each of the mounting racks 60 includes a mounting surface 601 and two lateral walls 61 at both sides of the mounting surface 601. In the mounting surface 601 is formed a plurality of mounting holes 63. Each of the lateral walls 61 is formed with an upper hook 611 and a lower hook 612 to be hooked to the upper and lower rods 54, 55. Each of the lower hooks 612 is formed with a pivot hole 65.

Each of the locking members 70 is made of flexible material and includes a pulling end 73 with a pulling block 731. At both sides of the pulling end 73 are formed two pivot portions 71, and each of the pivot portions 71 is provided with a pivot member 711. Between the pivot portions 71 and the pulling end 73 is formed a locking portion 72 in the form of an arch-shaped concave. The pivot members 711 of the locking members 70 are fitted in the pivot holes 65 of the mounting racks 60, so that the locking members 70 are able to pivot with respect to the mounting racks 60 via the pivot portions 71, and the locking portion 72 are flexibly deformable to be engaged with the lower rod 55.

Figure 4:
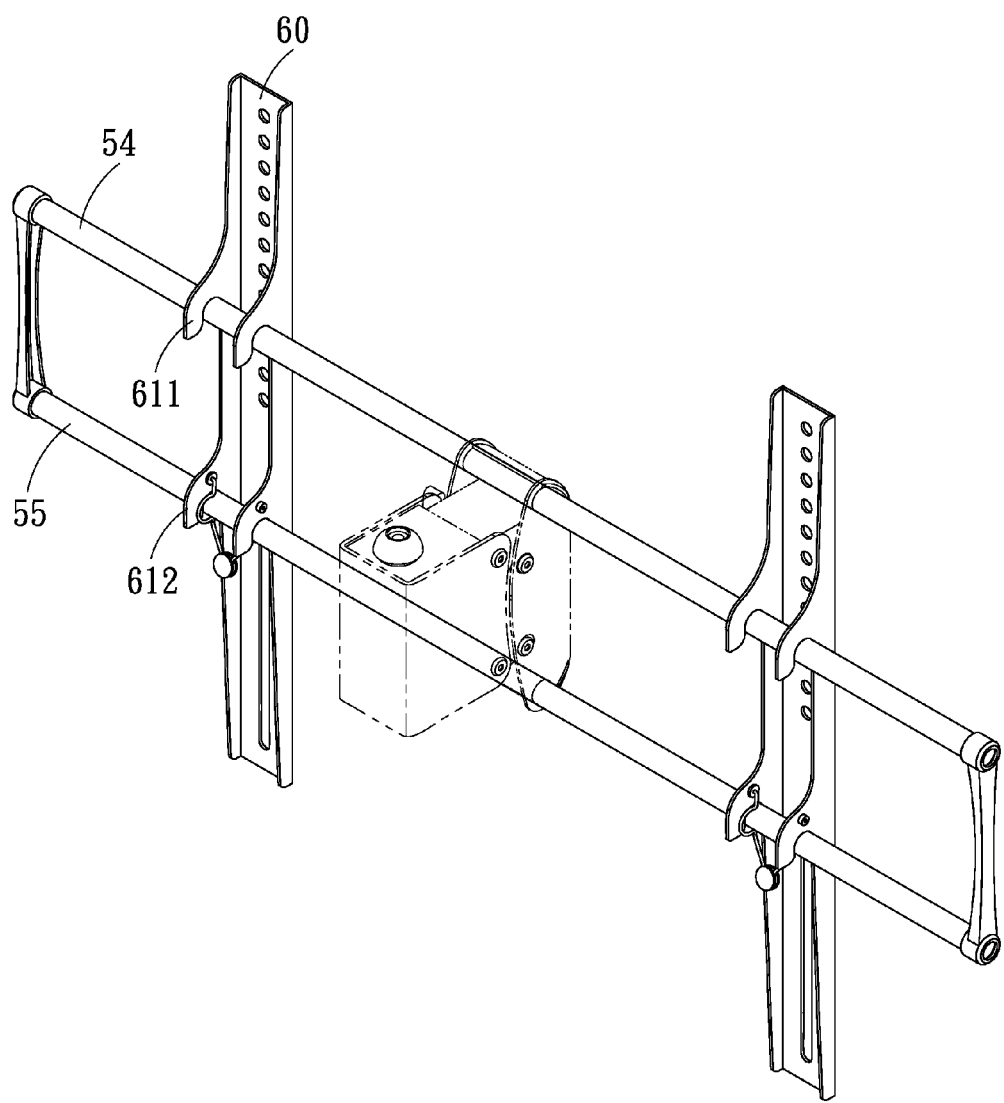
FIG. 4 is another perspective view of the locking device for a display mounting assembly in accordance with the present invention, wherein the locking member is pressed onto the lower rod.

What mentioned above are the structural relationships of the main components of the present invention, for a better understanding of the function and effect of the present invention, reference should be made to FIG. 4.

In assembly of the mounting racks 60 to the base frame 50, firstly, the user has to press the upper and lower hooks 611, 612 of the two mounting racks 60 onto the upper and lower rods 54, 55 of the base frame 50.

Figure 5:
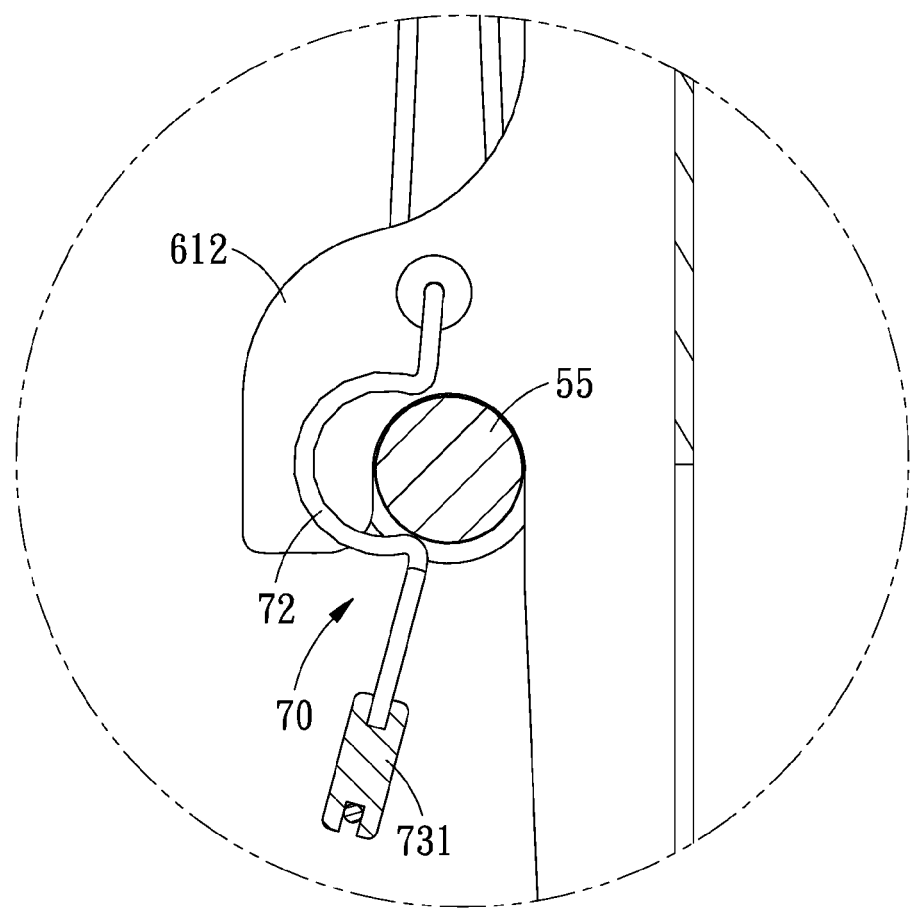
FIG. 5 is an enlarged view in accordance with the present invention showing that the locking portion has not been engaged with the lower rod yet.

Then, as shown in FIG. 5, which is an enlarged view of a part of the locking member 70, the lower hook 612 and the lower rod 55 (for easy explanation, only one set of locking member 70, lower hook 612 and lower rod 55 is shown), at this moment, the locking portion 72 has not been engaged with the lower rod 55 yet.

Figure 6:
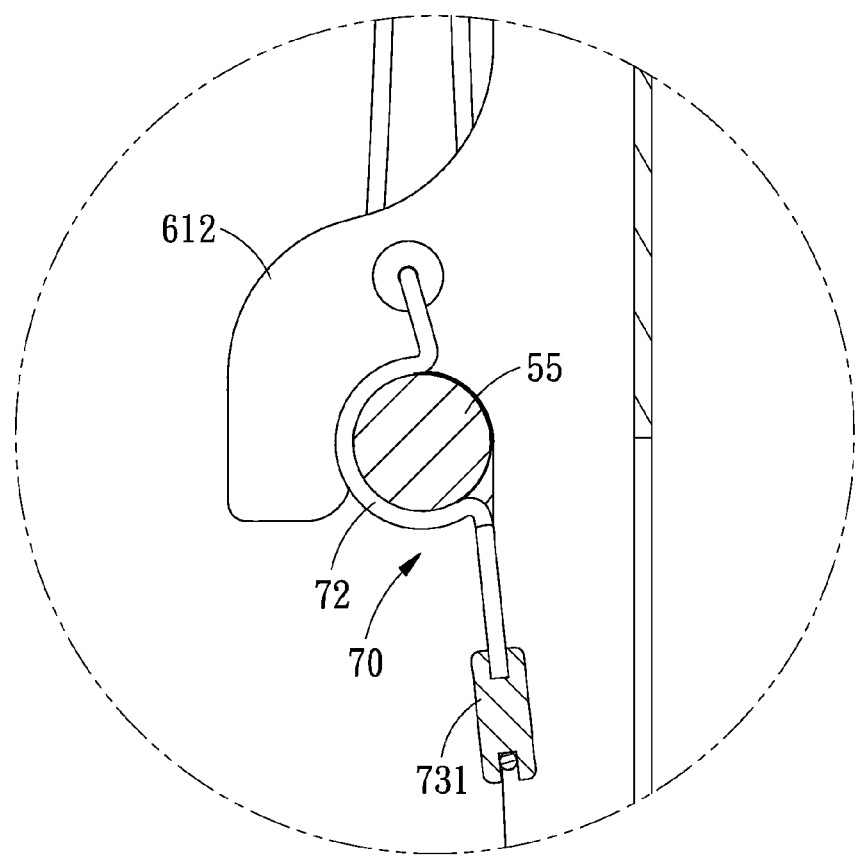
FIG. 6 is an enlarged view in accordance with the present invention showing that the locking portion has been engaged with the lower rod yet.

Referring then to FIG. 6, the user can press the pulling block 731, since the locking member 70 is flexible, the locking portion 72 will be deformed to engage with the lower rod 55 when pressed.

It is to be noted that the present invention uses the locking members 70 as substitutes for the conventional bolts. The locking portion 72 can be engaged with or disengaged from the lower rod 55 simply by pressing or pulling the pulling block 731, which makes the assembly and disassembly much easier and quicker.

Further, the present invention doesn't have to drill through holes and the elongated holes in the mounting racks, which consequently reduces manufacturing cost.

Figure 7:
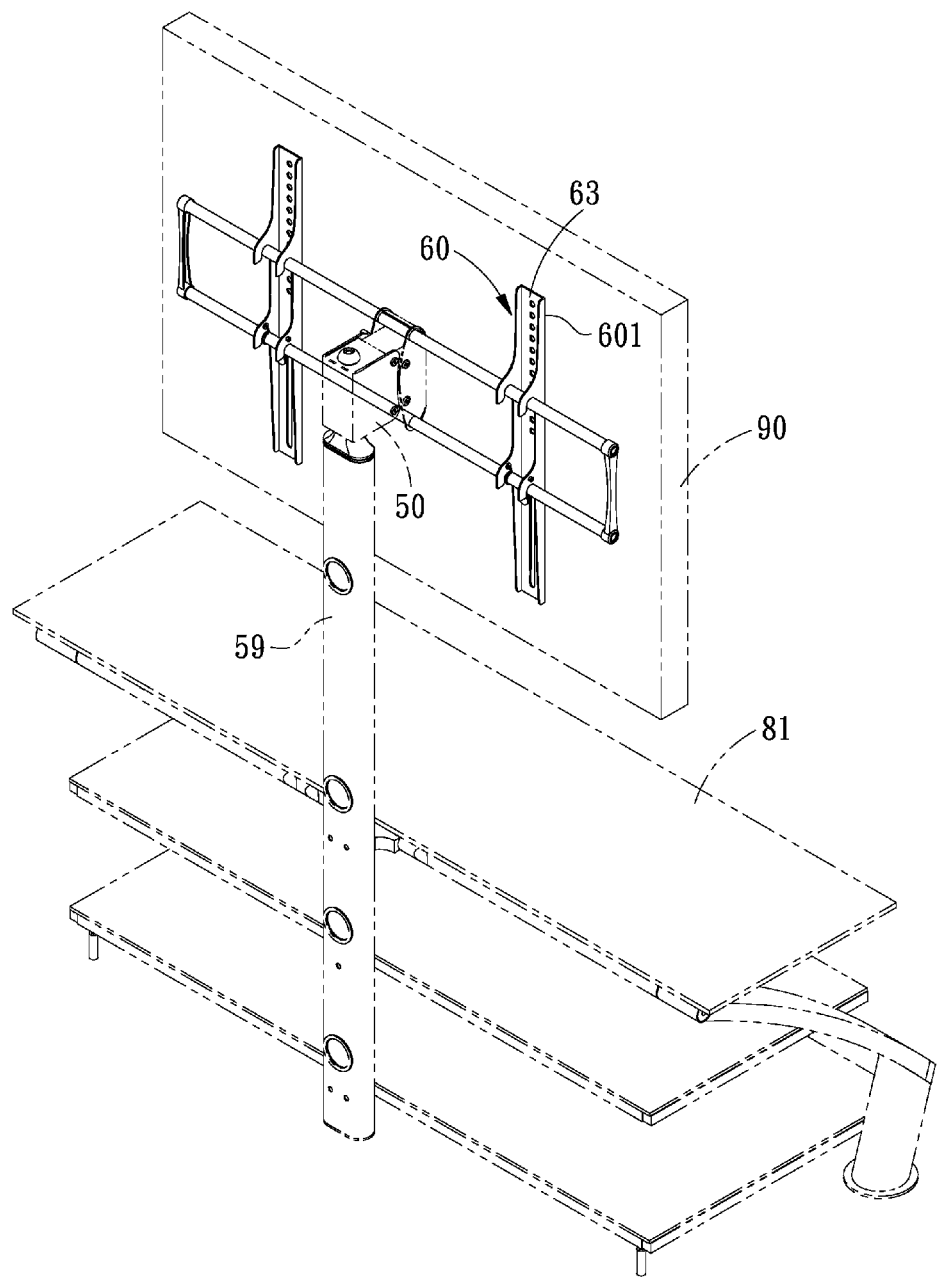
FIG. 7 is an operational view of the locking device for a display mounting assembly in accordance with the present invention.

Referring finally to FIG. 7, the locking device for a display mounting assembly of the present invention can be fixed to the back of a display 90 by screwing bolts (not shown) through the mounting holes 63 of the mounting racks 60, making the mounting surfaces 601 of the mounting racks 60 abut against the back of the display 90, and then the display mounting assembly is assembled to a mounting seat 81 (which is a shelf in this embodiment) by the fixing member 51 and connecting rods 59.

While we have shown and described various embodiments in accordance with the present invention, it is clear to those skilled in the art that further embodiments may be made without departing from the scope of the present invention.

What is claimed is:

1. A locking device for a display mounting assembly comprising:
   a base frame formed by an upper rod, a lower rod, a left rod, and a right rod;
   two mounting racks each including a mounting surface and two lateral walls at both sides of the mounting surface, in the mounting surface being formed a plurality of mounting holes, each of the lateral walls being formed with an upper hook and a lower hook to be hooked to the upper and lower rods, each of the lower hooks being formed with a pivot hole; and
   two locking members made of flexible material and each including a pulling end, at both sides of the pulling end being formed two pivot portions, and each of the pivot portions being provided with a pivot member, between the pivot portions and the pulling end being formed a locking portion in the form of an arch-shaped concave, the pivot members of the locking members being fitted in the pivot holes of the mounting racks, so that the locking members are able to pivot with respect to the mounting racks via the pivot portions, and the locking portion are flexibly deformable to be engaged with the lower rod.

2. The locking device for a display mounting assembly as claimed in claim 1, wherein a fixing member is disposed between the upper and lower rods.

3. The locking device for a display mounting assembly as claimed in claim 1, wherein the pulling end of the respective locking members is formed with a pulling block.

\* \* \* \* \*